United States Patent
Moenkemoeller

(10) Patent No.: US 10,682,979 B2
(45) Date of Patent: Jun. 16, 2020

(54) SENSOR SYSTEM FOR DETECTING EXTENSION AND/OR TENSION IN SEAT BELT

(71) Applicant: paragon GmbH & co KgaA, Delbrueck (DE)

(72) Inventor: Ralf Moenkemoeller, Bielefeld (DE)

(73) Assignee: paragon GmbH & Co. KGaA, Delbrueck (DE)

( * ) Notice: Subject to any disclaimer, the term of this patent is extended or adjusted under 35 U.S.C. 154(b) by 0 days.

(21) Appl. No.: 16/157,399

(22) Filed: Oct. 11, 2018

(65) Prior Publication Data

US 2020/0114868 A1 Apr. 16, 2020

(30) Foreign Application Priority Data

Oct. 20, 2017 (DE) .................. 10 2017 009 788

(51) Int. Cl.
*B60R 22/48* (2006.01)
*B60R 22/34* (2006.01)
*G01L 5/101* (2020.01)

(52) U.S. Cl.
CPC .............. *B60R 22/48* (2013.01); *B60R 22/34* (2013.01); *G01L 5/101* (2013.01); *B60R 2022/4825* (2013.01); *B60R 2022/4841* (2013.01)

(58) Field of Classification Search
CPC . B60R 22/48; B60R 22/34; B60R 2022/4825; B60R 2022/4841; G01L 5/101
USPC .......................................................... 73/768
See application file for complete search history.

(56) References Cited

U.S. PATENT DOCUMENTS

| | | | | |
|---|---|---|---|---|
| 4,655,312 A | * | 4/1987 | Frantom | B60R 22/44 180/268 |
| 4,815,674 A | * | 3/1989 | Blake | B60R 22/343 188/267.1 |
| 6,572,148 B2 | * | 6/2003 | Wittenberg | B60R 22/12 180/268 |
| 6,581,960 B1 | * | 6/2003 | Schondorf | B60R 21/01546 180/273 |
| 7,576,642 B2 | | 8/2009 | Rodemer | |
| 8,201,850 B2 | * | 6/2012 | Browne | D03D 1/0005 280/801.1 |
| 8,262,133 B2 | * | 9/2012 | Usoro | B60R 22/4676 242/381 |
| 2015/0360643 A1 | * | 12/2015 | Cech | B60R 22/48 297/217.3 |

* cited by examiner

*Primary Examiner* — Octavia Hollington
(74) *Attorney, Agent, or Firm* — Andrew Wilford

(57) ABSTRACT

A sensor system for determining extension or tension in a seat belt of a seat-belt system in which the belt extends from and can be wound up on a retractor. The system has an electrical conductor extending longitudinally along the belt, a retractor for paying out and winding up the belt and the conductor thereon, and n electrode juxtaposed with the retractor. A controller connected to the conductor applies an electrical voltage to the conductor and is also connected to the electrode for detecting the voltage in the conductor.

8 Claims, 1 Drawing Sheet

SENSOR SYSTEM FOR DETECTING EXTENSION AND/OR TENSION IN SEAT BELT

FIELD OF THE INVENTION

The present invention relates to a sensor system for use with a vehicular seat belt. More particularly this invention concerns such a sensor system that detects the extension and/or the tension in the belt.

BACKGROUND OF THE INVENTION

Such a sensor system is typically integrated into a triggering device for actuating an airbag system of a motor vehicle or for determining whether or not a vehicle seat is occupied. Electrical conductors in contact with seat belts of seat-belt systems are used for such sensor systems.

A sensor system is known from U.S. Pat. No. 7,576,642 to provide an electrical conductor in a seat belt that is contacted at two positions within the seat belt in order to apply a measuring current to it for an inductance measurement. Since only one end of the seat belt is spatially fixed in relation to the seat-belt system, the unfixed end of the seat belt or the position provided therein of the electrical conductor that is integrated into the seat belt must be contacted via a sliding contact or a spiral cable, which is complex technically, constructively, and economically.

OBJECTS OF THE INVENTION

It is therefore an object of the present invention to provide an improved seat-belt tension and/or extension sensor system.

Another object is the provision of such an improved seat-belt tension and/or extension sensor system that overcomes the above-given disadvantages, in particular that determines the extension and/or the tension in a seat belt that can be operated without a costly electric circuit and, in addition, can be manufactured with relatively little technical and constructive efforts.

SUMMARY OF THE INVENTION

A sensor system for determining extension or tension in a seat belt of a seat-belt system in which the belt extends from and can be wound up on a retractor. The system has according to the invention an electrical conductor extending longitudinally along the belt, a retractor for paying out and winding up the belt and the conductor thereon, and n electrode juxtaposed with the retractor. A controller connected to the conductor applies an electrical voltage to the conductor and is also connected to the electrode for detecting the voltage in the conductor.

The belt can be wound up into a coil in the retractor or payed out from the coil so that the coil changes diameter as the belt is extended or retracted. This diameter can therefore be detected by the electrode without contact to determine how much of the belt has been extended from the retractor, thereby giving a clear indication of whether the seat is or is not occupied.

In another arrangement according to the invention, the belt passes over a spring-biased deflectable guide after exiting the retractor and a second electrode is juxtaposed with the belt at or near the guide. As tension in the belt increases and decreases, the guide moves in and out and this movement is sensed as described above so that the second electrode can determine the tension in the belt.

Both systems use the same belt provided with an electrically energized longitudinally throughgoing conductor and work without contact so as to provide information about the belt, namely the extension or the tension, in a manner requiring no significant moving parts and generating little friction. Thus this system is simple and can be counted on to have a long service life. The signal voltage applied to the conductor in the belt can be very small so as not to need elaborate shielding and the conductor can be so thin as to be virtually imperceptible.

In order to provide meaningful measured values over the entire range of extension of the seat belt, it is advantageous if the electrical conductor of the sensor system extends over the entire length of the seat belt of the seat-belt system.

Advantageously, the receiving electrode is positioned in relation to the retractor onto which the seat belt can be rolled up and from which the seat belt can be unrolled such that, as the extension of the seat belt increases, the spacing between the seat belt remaining on the retractor on the one hand and the receiving electrode on the other hand increases.

For this purpose, it is advantageous if the receiving electrode is positioned at a fixed radial spacing from a rotation axis of the retractor of the seat-belt system.

In order to simplify the evaluation of the measurement signal received by the receiving electrode and detected by the sensor system to the greatest possible extent, it is advantageous if a mathematical formula or a table of values is stored in the sensor system by means of which each spacing measured between the receiving electrode on the one hand and the seat belt located on the retractor on the other hand can be correlated with an associated extension of the seat belt in the sensor system.

Inferences can be easily made about the belt tension acting on the seat belt by means of a generic sensor system if it has a spring over which the seat belt of the seat-belt system is guided and that is guided appropriately on the seat belt of the seat-belt system and can be deflected out of its rest position according to the belt tension acting on the seat belt and has an additional receiving electrode that is arranged near the spring and in which a voltage that can be measured by means of the sensor system can be induced by means of the electrical signal acting on the electrical conductor of the seat belt.

According to an advantageous embodiment of this sensor system according to the invention, the additional receiving electrode thereof is arranged in relation to the spring that is guided over the seat belt of the seat-belt system such that, as the deflection of the spring from its rest position changes, the spacing between the seat belt that is guided over the spring on the one hand and the additional receiving electrode on the other hand changes.

The additional receiving electrode is advantageously arranged in relation to the spring and/or the seat belt that is guided over the spring such that the spacing between the seat belt that is guided over the spring on the one hand and the additional receiving electrode on the other hand changes proportionally or inversely proportionally to the belt tension.

In order to enable reliable inferences to be made about the belt tension with as little complexity as possible, it is advantageous if a mathematical formula or a table of values is stored in the sensor system by means of which each spacing measured between the additional receiving electrode on the one hand and the seat belt that is guided over the spring on the other hand can be correlated with an associated belt tension.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
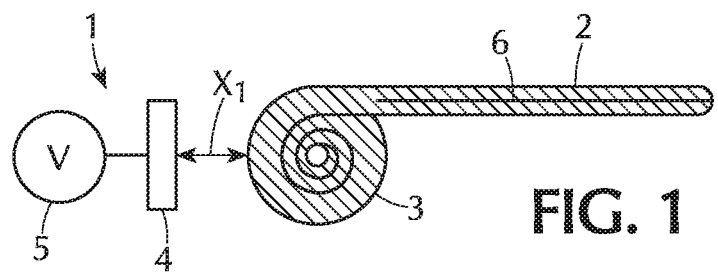
FIG. 1 is a schematic view of a sensor system according to the invention.
Figure 2:
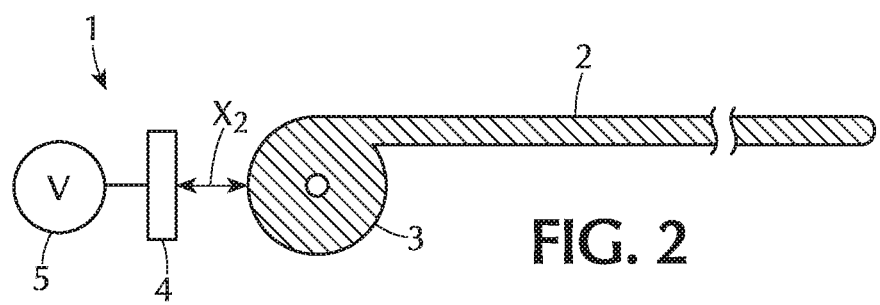
FIG. 2 is a schematic view like FIG. 1 in which a larger portion of the seat belt has been unwound from its retractor.

As seen in the drawing a sensor system 1 according to the invention determines the extension of the belt 2 of a seat-belt system of which only the seat belt 2 and a retractor 3 are shown in FIGS. 1 and 2. The belt 2 is wound on the retractor 3 and can be unwound from it. An electrical conductor shown partially at 6 in the seat belt 2 extends approximately over the entire length of the seat belt 2.

With a relatively small extension of the seat belt 2, a large portion of it is rolled up on the retractor 3 as shown in FIG. 1. With a relatively large extension, the portion of the seat belt 2 on the retractor 3 is small by comparison, as shown in FIG. 2.

As also shown in FIGS. 1 and 2, a receiving electrode 4 of the sensor system 1 is positioned at a fixed spacing from a rotation axis A of the retractor 3. The receiving electrode 4 of the sensor system 1 is connected to a controller 5 that supplies a small signal voltage to the electrical conductor 6.

The signal voltage applied to the electrical conductor 6 integrated into the seat belt 2 induces a measurable voltage in the receiving electrode 4 of the sensor system 1. This measurement voltage is, inter alia, a function of a spacing x between the electrical conductor 6 integrated into the seat belt 2 on the one hand and the receiving electrode 4 that is positioned at a fixed spacing from the rotation axis of the retractor 3 of the seat-belt system.

As can be seen from FIGS. 1 and 2, when the seat-belt system is in the state shown in FIG. 1, in which most of the seat belt 2 is wound on the retractor 3, the spacing $x_1$ is smaller than when the seat-belt system is in the state shown in FIG. 2, in which only a small portion of the seat belt 2 is wound on the retractor 3 and a spacing $x_2$ between the electrical conductor 6 integrated into the seat belt 2 and the receiving electrode 4 at a fixed spacing from the rotation axis A of the retractor 3 of the seat-belt system is relatively large.

The extension of the seat belt 2 of the seat-belt system can then be determined from the strength of the measurement voltage that is induced in the receiving electrode 4 of the sensor system 1.

The spacing between the receiving electrode 4 and the electrical conductor 6 integrated into the seat belt 2 is proportional to the voltage detected by the controller 5 and induced in the receiving electrode 4. This makes it possible for the a microprocessor of the controller 5 to determine determining the extension of the seat belt 2 of the seat-belt system from the measurement voltage on the basis of a table or formula stored therein.

Figure 3:
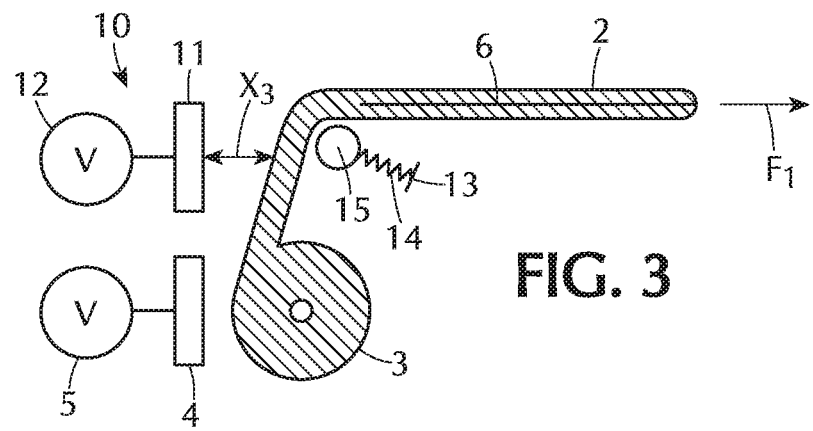
FIG. 3 is a schematic view a sensor system for determining the tension of a seat belt.
Figure 4:
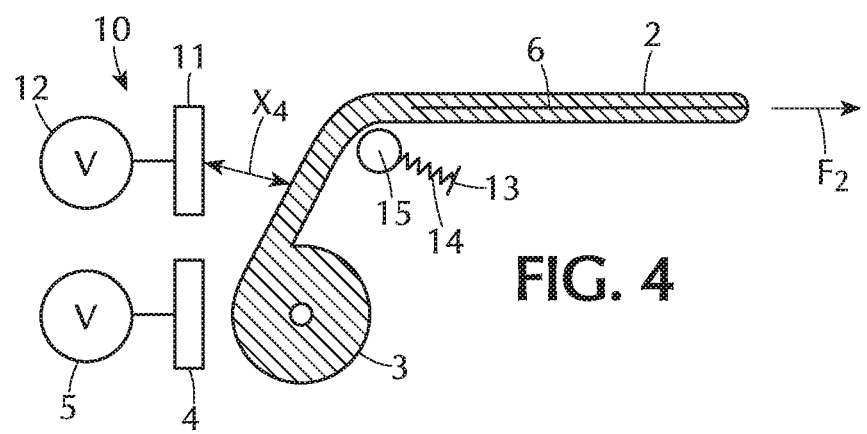
FIG. 4 is a view like FIG. 3 in which the belt tension acting on the seat belt of the seat-belt system is greater than in FIG. 3.

FIGS. 3 and 4 show an embodiment of a sensor system 10 according to the invention for determining the tension in the seat belt 2 of the seat-belt system. The seat belt 2 of this seat-belt system is also provided with the above-described electrical conductor 6, with it being possible for the electrical conductor 6 to be acted upon by an electrical signal.

This sensor system 10 also has a receiving electrode 11 to which a controller 12 is connected. A measurement signal that corresponds to the electrical signal introduced into the electrical conductor 6 of the seat belt 2 and that induces a measurable voltage in the receiving electrode 11 can be detected by the controller 12 of the sensor system 10 as in FIGS. 1 and 2.

The receiving electrode 11 is positioned at a fixed spacing from the rotation axis A of the retractor 3 of the seat-belt system or from a fixed support 13 of a spring 14 of the sensor system 10.

The seat belt 2 of the seat-belt system passes partially around a roller-type guide 15 positioned at the free end of the spring 14 that bears outwardly against the support 13 at the other end.

Depending on the belt tension $F_1$ acting on the seat belt 2, which in FIG. 3 is relatively small, and, in the case of the illustration in FIG. 4, is shown at $F_2$ and is relatively large, the spring 14 is compressed by the force acting on it via its guide 15. As a result, a spacing $x_3$ between the receiving electrode 11 of the sensor system 10 and the seat belt 2 carrying the electrical conductor 6 changes. The further the spring 14 is compressed from its rest position toward its support 13, the greater the spacing between the receiving electrode 11 of the sensor system 10 on the one hand and the portion of the seat belt 2 opposite this receiving electrode 11 on the other hand. Accordingly, the measurement signal detected in the controller 12 that corresponds to the voltage induced in the receiving electrode 11 is a measured quantity from which inferences can be made about the spacing between the receiving electrode 11 and the seat belt passing over the guide 15 of the spring 14. Since this spacing $x_3$ in FIG. 3 and $x_4$ in FIG. 4, depends on the amount of the belt tension F1 or F2, current values for the current belt tension can also be determined by means of the sensor system 10.

A microprocessor the controller 12 of the sensor system 10 in which a table or a formula is stored from which the relationship between the belt tension $F_1$ or $F_2$ on the one hand and the measurement signal detected in the controller 12 of the sensor system 10 on the other hand follows.

As will readily be understood, it is possible to combine the sensor system 1 shown in FIGS. 1 and 2 and the sensor system 10 shown in FIGS. 3 and 4. In that case, a single electrical conductor 6 within the seat belt 2 is sufficient. Also, only a single device is required for generating the signal voltage that acts on the electrical conductor 6. The same applies to the microprocessor of the combined sensor system 1, 10.

I claim:

1. A sensor system for determining extension or tension in a seat belt of a seat-belt system in which the belt extends from and can be wound up on a retractor, the system comprising:
   an electrical conductor extending longitudinally along the belt and extending over substantially the entire length of the belt;
   a retractor for winding up the belt and the conductor thereon into a helical coil in the retractor and for paying out the belt and the conductor from the retractor;
   an electrode spacedly juxtaposed with the coil in the retractor; and control means connected to the conductor for applying an electrical voltage to the conductor and also connected to the electrode for detecting the voltage in the conductor.

2. The sensor system defined in claim 1, wherein the electrode is positioned at a fixed radial spacing from an axis of the retractor about which the belt is wound in the coil, whereby a radial spacing between the electrode and belt varies as the belt is wound up and payed out and the voltage detected by the sensor varies proportionately with the spacing.

3. The sensor system defined in claim 1, wherein the control means evaluates the voltage detected by the sensor according to a mathematical formula or a table of values stored in the control means by correlating a spacing measured between the electrode the belt on the retractor with an extension of the seat belt from the retractor.

4. The sensor system defined in claim 1, further comprising:
   a deflectable guide over which the belt passes; and
   a spring biasing the guide into an outer position extending the belt, the electrode being spacedly juxtaposed with the belt adjacent the guide for detecting a position of the belt and guide and thereby determining a tension in the belt.

5. The sensor system defined in claim 4, wherein the electrode is fixed at a spacing from the guide and belt.

6. The sensor system defined in claim 5, wherein the guide is positioned to move proportionately in accordance with tension in the belt.

7. The sensor system defined in claim 4, wherein the control means evaluates the voltage detected by the sensor according to a mathematical formula or a table of values stored in the control means by correlating a spacing measured between the electrode the belt at the guide retractor with a tension of the belt.

8. A sensor system for determining extension or tension in a seat belt of a seat-belt system in which the belt extends from and can be wound up on a retractor, the system comprising:
   an electrical conductor extending longitudinally along the belt;
   a retractor for winding the belt and the conductor thereon into a coil and paying out the belt from the coil, whereby a diameter of the coil changes as the belt is payed out or wound up;
   a first electrode juxtaposed with the retractor;
   first control means connected to the conductor for applying an electrical voltage to the conductor and also connected to the first electrode for detecting the voltage in the conductor, whereby the detected voltage is proportional to a spacing of the first electrode from the coil and to an extension of the belt from the retractor;
   a deflectable guide offset from the retractor and over which the belt passes;
   a second electrode juxtaposed with the belt at the guide;
   a spring biasing the guide into an outer position extending the belt, whereby a spacing of the belt from the second electrode varies depending on a tension in the belt; and
   second control means connected to the conductor for detecting the voltage in the conductor and determining from the detected voltage the tension in the belt.

* * * * *